March 17, 1931.  J. H. HUFFSTUTTER  1,797,089
WATER POWER DEVICE
Filed Jan. 26, 1929   2 Sheets-Sheet 2
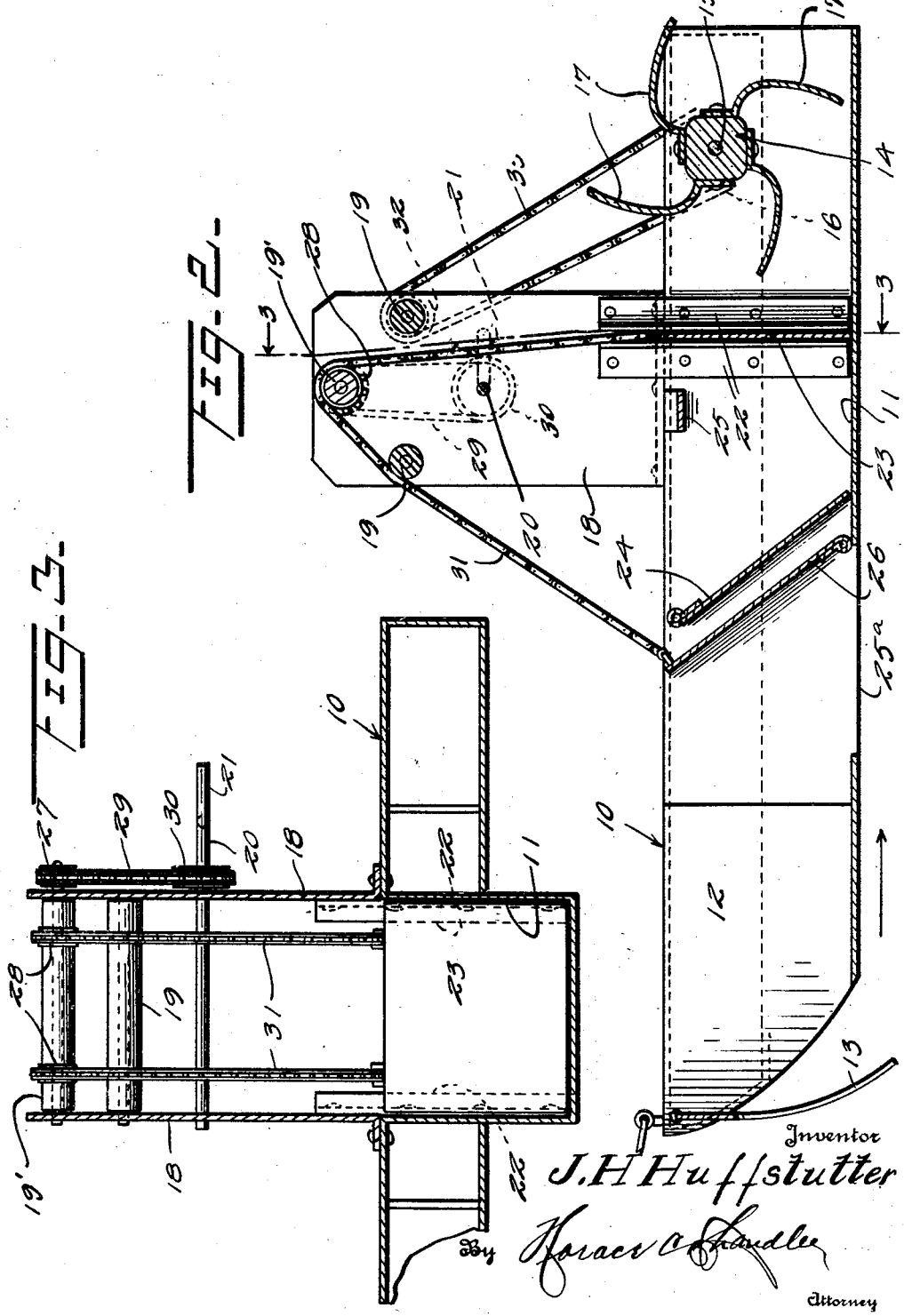
Inventor
J. H. Huffstutter
By Horace A. Handlee
Attorney Patented Mar. 17, 1931

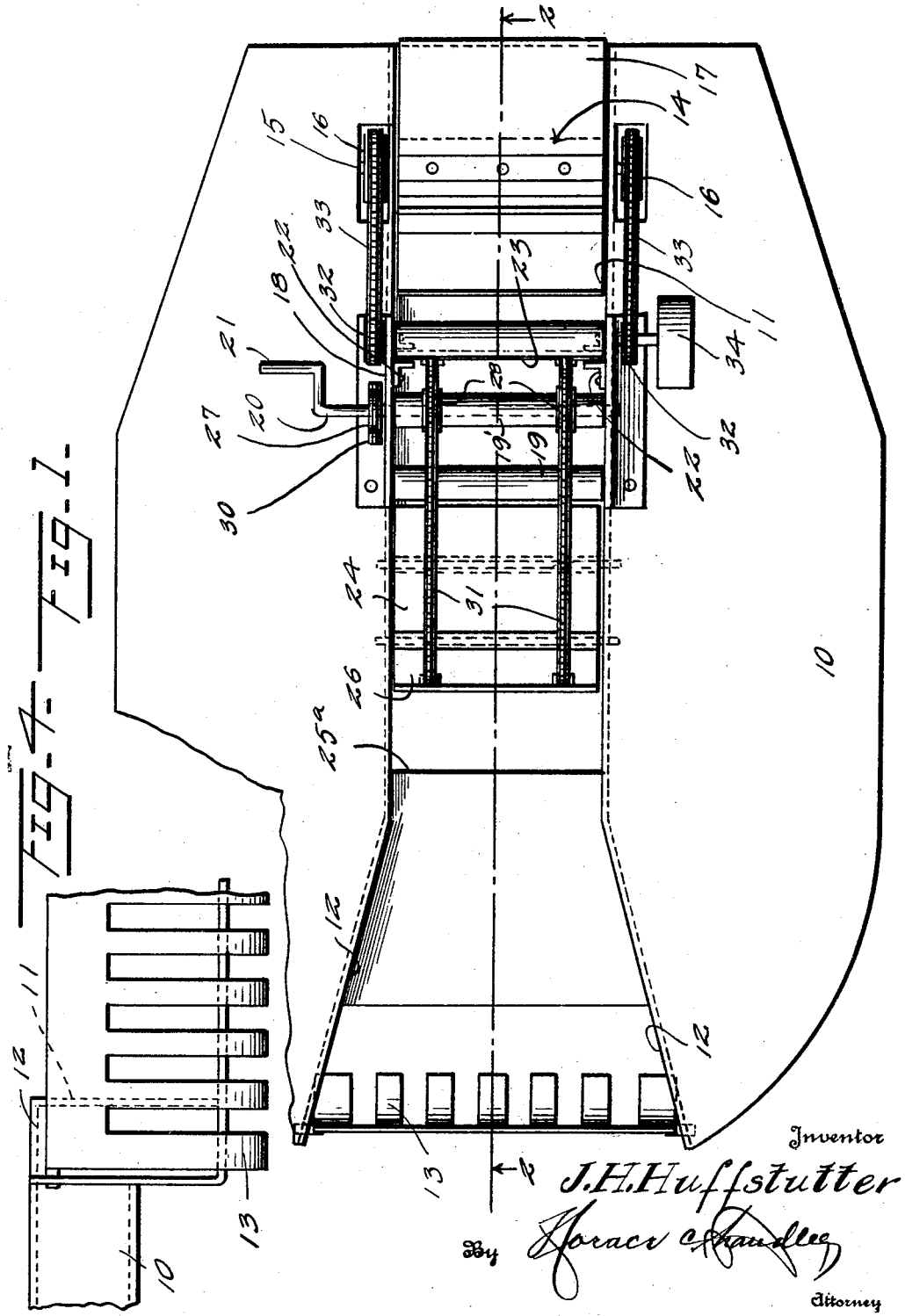

1,797,089

UNITED STATES PATENT OFFICE

JAMES H. HUFFSTUTTER, OF KEARNEY, NEBRASKA

WATER-POWER DEVICE

Application filed January 26, 1929. Serial No. 335,340.

This invention relates to new and useful improvements in power devices, and particularly to water power devices.

One object of the present invention is to provide a device in the form of a boat or float, adapted to be held in a stationary position within a suitable portion of a running stream, and which will be operable by said stream to produce power for running various machinery on the shore, adjacent the stream.

Another object is to provide a device of this character which is equipped with novel means for controlling the flow of water to a water wheel, arranged on the float or boat, so that the power can be cut off when desired.

Other objects and advantages will be apparent from the following description when taken in connection with the accompanying drawings.

In the drawings:

Figure 1 is a plan view of a water power device made in accordance with the present invention.

Figure 2 is a vertical longitudinal central sectional view, on the line 2—2 of Figure 1.

Figure 3 is a vertical transverse sectional view on the line 3—3 of Figure 2.

Figure 4 is a front elevation of a portion of the device.

Referring particularly to the accompanying drawings, 10 represents a flat bottomed boat or float, which has a longitudinally and centrally extending channel 11, formed therein, the ends of which open through the ends of the float or boat. One end of the channel has its side walls flared outwardly, as at 12, whereby to permit the easy entrance of the stream or current of water into the channel. A barred gate or barrier 13 is mounted in the entrance end of the channel, to catch floating material, and prevent same entering the channel. In the other end of the channel there is mounted a water wheel 14, the shaft 15 of which is provided with the sprocket wheels 16, to which mention will be made later herein. The wheel is provided with a plurality of radially extending curved blades 17, adapted to be engaged by the current of water flowing through the channel, whereby to cause the rotation of the wheel. Mounted in straddling relation to the channel 11, adjacent the water wheel 14 is an upright frame 18, and mounted in the upper portion of the frame are the transversely extending rollers 19, while a transverse shaft 20 is mounted in the lower portion of said frame, said shaft having a crank handle 21 on one end. Mounted on opposite sides of the channel, below the frame 18, are the channeled guides 22, and slidable vertically in said guides is a flood gate 23. Mounted transversely in the upper portion of the channel 11, at the other side of the frame 18, is a gravity door or baffle 24, a transverse stop member 25 being mounted in the upper portion of the channel to limit the upward swinging movement of said gate. In the bottom of the channel, forwardly of the said gate 24, is an opening 25ª, and hinged in said opening, for vertical movement, is a door or gate 26, said gate serving to permit water to flow through the channel when in lowered position, and to stop such flow when raised.

The uppermost of the rollers 19, and designated as 19', to distinguish it from the others, is provided with the sprocket wheels 27 and 28, the former of which is engaged by a chain 29, which chain also engages with a sprocket wheel 30, on the operating shaft 20, whereby the rotation of the said shaft transmits rotary motion to the said roller 19'. Engaged on the other sprocket wheels 28 are the chains 31, each chain having one end secured to the free end of the gate or door 26, and its other end secured to the upper end of the vertically slidable flood gate 23. The roller 19, adjacent the water wheel, is provided with sprocket wheels 32, and engaged with these sprocket wheels, and with the sprocket wheels 16, of the shaft 15, of the wheel 14, are the drive chains 33, such roller being provided with a belt wheel 34 from which the power can be transmitted to the machinery which is to be driven.

It will be noted that when the shaft 20 is rotated in one direction, the chains 31 will be moved to raise the door 26, and lower the flood gate 23, whereby the water is prevented from flowing through the channel 11, to rotate the water wheel, such water being deflected downwardly through the opening 25, by the door 26. The door or gate 24 will then fall by gravity. When the shaft 20 is rotated in the other direction, the door 26 will be lowered into closed position, while the gate 23 will be raised. The current of water will then flow over the gate 26, through the channel, beneath the gate 23, and cause the rotation of the water wheel.

What is claimed is:

A water power device including a float having a longitudinal channel therethrough and an opening in the bottom thereof adjacent one end, a water wheel mounted in the other end of the channel, a frame rising from the float and straddling said channel adjacent to and upstream from said wheel, transverse rollers mounted in the frame, sprockets on one of said rollers, vertical guides on the sides of said channel beneath said frame, a gate slidable vertically in said guides, a door in the channel movable into and out of closing relation to said bottom opening, a chain having its ends connected respectively with an end of said gate and the free end of said door, a hinged gravity baffle adjacent said door and between said door and said gate, and means for rotating the sprocket carried roller to move said chain, whereby to simultaneously open and close said gate and close and open said door.

In testimony whereof, I affix my signature.

JAMES H. HUFFSTUTTER.